United States Patent
Hirani et al.

(10) Patent No.: US 10,916,252 B2
(45) Date of Patent: Feb. 9, 2021

(54) ACCELERATED DATA TRANSFER FOR LATENCY REDUCTION AND REAL-TIME PROCESSING

(71) Applicant: NVIDIA Corporation, Santa Clara, CA (US)

(72) Inventors: Aly Hirani, San Jose, CA (US); Xiao Bo Zhao, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 193 days.

(21) Appl. No.: 16/169,837

(22) Filed: Oct. 24, 2018

(65) Prior Publication Data

US 2019/0147884 A1    May 16, 2019

Related U.S. Application Data

(60) Provisional application No. 62/584,621, filed on Nov. 10, 2017.

(51) Int. Cl.
*G10L 15/28* (2013.01)
*G10L 15/22* (2006.01)
(Continued)

(52) U.S. Cl.
CPC .............. *G10L 15/285* (2013.01); *G06F 3/16* (2013.01); *G10L 15/063* (2013.01); *G10L 15/08* (2013.01);
(Continued)

(58) Field of Classification Search
CPC ... G10L 2015/088; G10L 25/51; G10L 25/78; G10L 25/84; G06F 3/0622
See application file for complete search history.

(56) References Cited

U.S. PATENT DOCUMENTS

| 4,654,848 A | 3/1987 | Noguchi | |
|---|---|---|---|
| 8,254,404 B2 * | 8/2012 | Rabenko | H04B 3/23 370/230.1 |

(Continued)

FOREIGN PATENT DOCUMENTS

| CN | 107527614 A | 12/2017 |
|---|---|---|
| GB | 2553040 B | 4/2018 |

OTHER PUBLICATIONS

Zhang et al., "AccelWord: Energy Efficient Hotword Detection through Accelerometer," MobiSys'15, ACM, May 2015, pp. 301-315.

(Continued)

*Primary Examiner* — Matthew H Baker
(74) *Attorney, Agent, or Firm* — Leydig, Voit & Mayer, Ltd.

(57) ABSTRACT

Systems and methods relying on recognition of a pattern in a data stream, such as detecting a hotword in an audio data stream are sensitive to latency (e.g., response time). To reduce power consumption, a low power processor may be used in combination with a higher power speech recognition device. When the hotword is detected by the low power signal processor, the primary speech recognition device is signaled to wake up and begin emptying a buffer storing the hotword and subsequent audio data. Latency is the delay incurred to recognize the hotword and begin emptying the buffer. To catch-up and reduce the latency, the buffer is drained at a faster rate than the buffer is filled until a latency reduction trigger is received. The latency reduction trigger is generated when the latency has been reduced to a predetermined level.

20 Claims, 13 Drawing Sheets

(51) Int. Cl.
*G10L 15/08* (2006.01)
*G10L 15/06* (2013.01)
*G06F 3/16* (2006.01)

(52) U.S. Cl.
CPC ........ *G10L 15/22* (2013.01); *G10L 2015/223* (2013.01)

(56) References Cited

U.S. PATENT DOCUMENTS

| | | | |
|---|---|---|---|
| 8,666,751 B2 | 3/2014 | Murthi et al. | |
| 9,349,386 B2* | 5/2016 | Adams | G10L 25/93 |
| 9,514,752 B2 | 12/2016 | Sharifi | |
| 9,542,933 B2 | 1/2017 | Mortensen | |
| 9,542,942 B2 | 1/2017 | Sharifi | |
| 9,589,564 B2 | 3/2017 | Sharifi | |
| 9,652,017 B2 | 5/2017 | Gustaysson et al. | |
| 9,653,079 B2 | 5/2017 | Gulati et al. | |
| 9,671,819 B2* | 6/2017 | Pirozzi | G06F 1/08 |
| 9,697,831 B2 | 7/2017 | Lesso et al. | |
| 9,711,144 B2 | 7/2017 | Nandy et al. | |
| 9,711,166 B2 | 7/2017 | Qutub et al. | |
| 9,767,798 B2 | 9/2017 | Kerr | |
| 9,779,726 B2 | 10/2017 | Hatfield et al. | |
| 9,779,732 B2* | 10/2017 | Lee | G10L 15/22 |
| 9,805,719 B2 | 10/2017 | Sharifi | |
| 9,940,930 B1 | 4/2018 | Campbell et al. | |
| 10,332,543 B1* | 6/2019 | Zopf | G10L 15/08 |
| 2014/0257821 A1* | 9/2014 | Adams | G10L 25/93 704/275 |
| 2014/0358552 A1* | 12/2014 | Xu | G06F 1/3215 704/275 |
| 2015/0066498 A1* | 3/2015 | Ma | G10L 25/84 704/233 |
| 2016/0011625 A1* | 1/2016 | Pirozzi | G06F 15/76 713/503 |
| 2016/0189706 A1 | 6/2016 | Zopf et al. | |
| 2016/0379635 A1 | 12/2016 | Page | |
| 2017/0068513 A1 | 3/2017 | Stasior et al. | |
| 2017/0154620 A1 | 6/2017 | Berthelsen et al. | |
| 2017/0242806 A1 | 8/2017 | Solbach et al. | |
| 2017/0316779 A1 | 11/2017 | Mohapatra et al. | |
| 2018/0018973 A1 | 1/2018 | Moreno et al. | |
| 2018/0174583 A1* | 6/2018 | Zhao | G10L 15/22 |
| 2018/0182390 A1 | 6/2018 | Hughes et al. | |
| 2018/0249246 A1 | 8/2018 | Kjems et al. | |

OTHER PUBLICATIONS

Ismert, M., "Making Commodity PCs Fit for Signal Processing," Proceedings of the USENIX Annual Technical Conference, Jun. 1998, 11 pages, retrieved from https://www.usenix.org/legacy/publications/library/proceedings/usenix98/full_papers/ismert/ismert.pdf.

* cited by examiner

ACCELERATED DATA TRANSFER FOR LATENCY REDUCTION AND REAL-TIME PROCESSING

CLAIM OF PRIORITY

This application claims the benefit of U.S. Provisional Application No. 62/584,621 titled "Leveraging a System with Real-Time limitations to Transfer Data Faster Than Real-Time," filed Nov. 10, 2017, the entire contents of which is incorporated herein by reference.

FIELD OF THE INVENTION

The present invention relates to real-time processing with reduced latency.

BACKGROUND

Recently, interfaces rely on recognition of a "hotword" in an audio signal to wake up a processor for processing subsequent commands encoded in the audio signal. When the hotword is detected, a primary speech recognition device is signaled to wake up and begin emptying a buffer storing the hotword and subsequent audio data. Latency or a delay is incurred to recognize the hotword and begin emptying the buffer. The latency persists as subsequent audio data is received and converted into commands for execution and is perceived by the user as a response time. It is desirable to minimize the response time. Conventional solutions require an additional faster communication path to "catch-up" and reduce the latency. The additional faster communication path adds extra cost to the system. There is a need for addressing these issues and/or other issues associated with the prior art.

SUMMARY

Systems and methods relying on recognition of a pattern in a data stream, such as detecting a hotword in an audio data stream are sensitive to latency (e.g., response time). To reduce power consumption, a low power signal processor may be used in combination with a higher power speech recognition device. When the hotword is detected by the low power signal processor, the primary speech recognition device is signaled to wake up and begin emptying a buffer storing the hotword and subsequent audio data. Latency is the delay incurred to recognize the hotword and begin emptying the buffer. To catch-up and reduce the latency, when the hotword is recognized, the buffer is drained at a faster rate than the buffer is filled until a latency reduction trigger is received. The latency reduction trigger is generated when the latency has been reduced to a predetermined level.

A method, computer readable medium, and system are disclosed for reducing latency for data transfers. The method includes steps of receiving a stream of input data at a first data rate by a real-time data processing system, downsampling the input data to a second data rate to produce downsampled data that is continuously stored into an output buffer, determining the downsampled data matches a data pattern, and transferring the downsampled data to a processing unit at the first data rate. In response to a latency reduction trigger, the downsampling is disabled to produce additional input data at the first data rate and the additional input data is transferred to the processing unit at the first data rate.

DETAILED DESCRIPTION

Speech recognition enables a user to interact with a system through voice by speaking a hotword followed by a command or a query. A signal processing unit that consumes less power compared may be used in combination with a more powerful processor, where the signal processing unit is used to monitor a data stream to recognize a data pattern (hotword) and then interrupt (e.g., wake up) the more powerful processor for processing the data stream. Although the signal processing unit is described in the context of processing an audio data stream, the signal processing unit may be used to process data streams for other types of data, such as image data to recognize a gesture or image pattern.

Figure 1A:
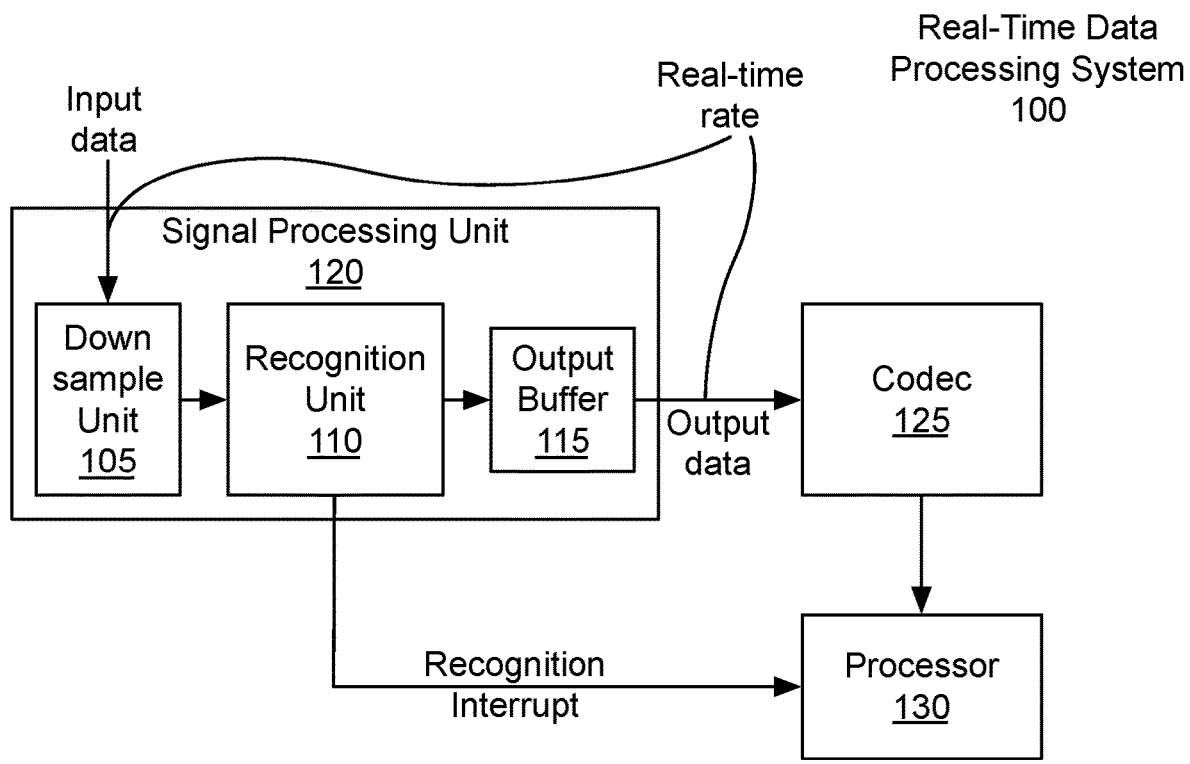
FIG. 1A illustrates a block diagram of a real-time data processing system configuration before a latency trigger event, in accordance with an embodiment.

FIG. 1A illustrates a block diagram of a real-time data processing system 100 configuration before a latency trigger event, in accordance with an embodiment. Although the real-time data processing system 100 is described in the context of processing units, one or more of the signal processing unit 120, codec 125, and processor 130 may be implemented as a program, custom circuitry, or by a combination of custom circuitry and a program. For example, the signal processing unit 120 may be implemented by a GPU (graphics processing unit), CPU (central processing unit), or any processor capable of processing the input data. Furthermore, persons of ordinary skill in the art will understand that any system that performs the operations of the real-time data processing system 100 is within the scope and spirit of embodiments of the present invention.

The real-time data processing system 100 includes a signal processing unit 120, a codec 125, and a processor 130. The signal processing unit 120 receives input data at a real-time (bit or data) rate and outputs output data at the same real-time rate. In an embodiment, the input data is received from a digital microphone configured to convert an audio signal to a pulse density modulation (PDM) signal. The signal processing unit 120 is configured to recognize a data pattern in the input data and generate a recognition interrupt that is output to the processor 130. In an embodiment, the signal processing unit 120 is a mini digital signal processor (DSP). In an embodiment, the signal processing unit 120 is always operating to detect the data pattern in the input data and only outputs data to the codec 125 once the data pattern is detected. In an embodiment, the signal processing unit 120 is configured to recognize more than one predetermined data pattern. One or more data patterns may be defined by a fixed representation or may be programmed. The one or more data patterns may be stored in the recognition unit 110.

The codec 125 encodes the output data into a different format for processing by the processor 130. In an embodiment, the output data is a PDM signal that is converted by the codec 125 to an inter-IC sound (I2S) signal. In an embodiment, the codec 125 is included within the processor 130 or is omitted and the processor 130 is configured to receive and encode the output data directly from the signal processing unit 120. To reduce power consumption, in an embodiment, the codec 125 is only enabled once the data pattern is detected.

The signal processing unit 120 includes a downsample unit 105, a recognition unit 110, and an output buffer 115. In an embodiment, the real-time rate of both the input data and output data for the signal processing unit 120 is fixed. In an embodiment, while the real-time rate is fixed during operation, the real-time rate may be changed to a different value. However, changing the real-time rate may be costly in terms time, requiring the output buffer 115 to be completely emptied and idling the downsample unit 105 and the recognition unit 110.

The real-time rate of the input data is reduced by the downsample unit 105 to produce downsampled data. For example, the real-time rate may be 32 or 48 Kbits/sec and the rate of the downsampled data may be 16 or 32 Kbits/sec, respectively. As shown in FIG. 1A, the downsampled data is processed by the recognition unit 110 to determine if a data pattern is recognized. The recognition unit 110 monitors the input data to determine when at least a portion of the input data matches a data pattern (e.g., hotword, image, gesture, etc.). When a match is detected, the recognition unit 110 generates a recognition interrupt that is output to the processor 130.

In an embodiment, the recognition unit 110 receives the input data at the real-time rate and the downsample unit 105 receives the input data from the recognition unit 110. In an embodiment, the downsample unit 105 and the recognition unit 110 are configured in parallel and both directly receive the input data. The downsampled data is continuously streamed into and stored in the output buffer 115. Once the data pattern is recognized by the recognition unit 110, the codec 125 drains the output buffer 115 at the real-time rate. In an embodiment, the codec 125 begins draining the downsampled input data from the sample buffer 115 in response to the recognition interrupt. In an embodiment, the signal processing unit 120 begins transferring the downsampled data to the codec 125 in response to receiving a read request from the processor 130 or the codec 125.

When the real-time rate is greater than the data rate of the downsampled data, the downsampled data is drained from the output buffer 115 at a faster rate than the downsampled data is stored into the output buffer 115. Specifically, the downsampled data is transferred at the real-time rate. Therefore, the latency from when the input data is received by the signal processing unit 120 and determined to match a data pattern, to when the downsampled input data is transferred to the codec 125 is reduced. The latency corresponds to the amount of downsampled data stored in the output buffer 115, assuming that all of the downsampled data stored in the output buffer 115 is transferred to the codec 125.

Eventually, the output buffer 115 is completely drained and the downsampling may be disabled. A latency reduction trigger event may be defined and used to disable the downsampling following a recognition interrupt. In an embodiment, the latency reduction trigger is generated when the output buffer 115 becomes empty. In an embodiment, the latency reduction trigger is generated when the output buffer 115 is drained to a predetermined level. In an embodiment, the latency reduction trigger is generated a predetermined amount of time after the downsampled data is determined to match the data pattern.

Figure 1B:
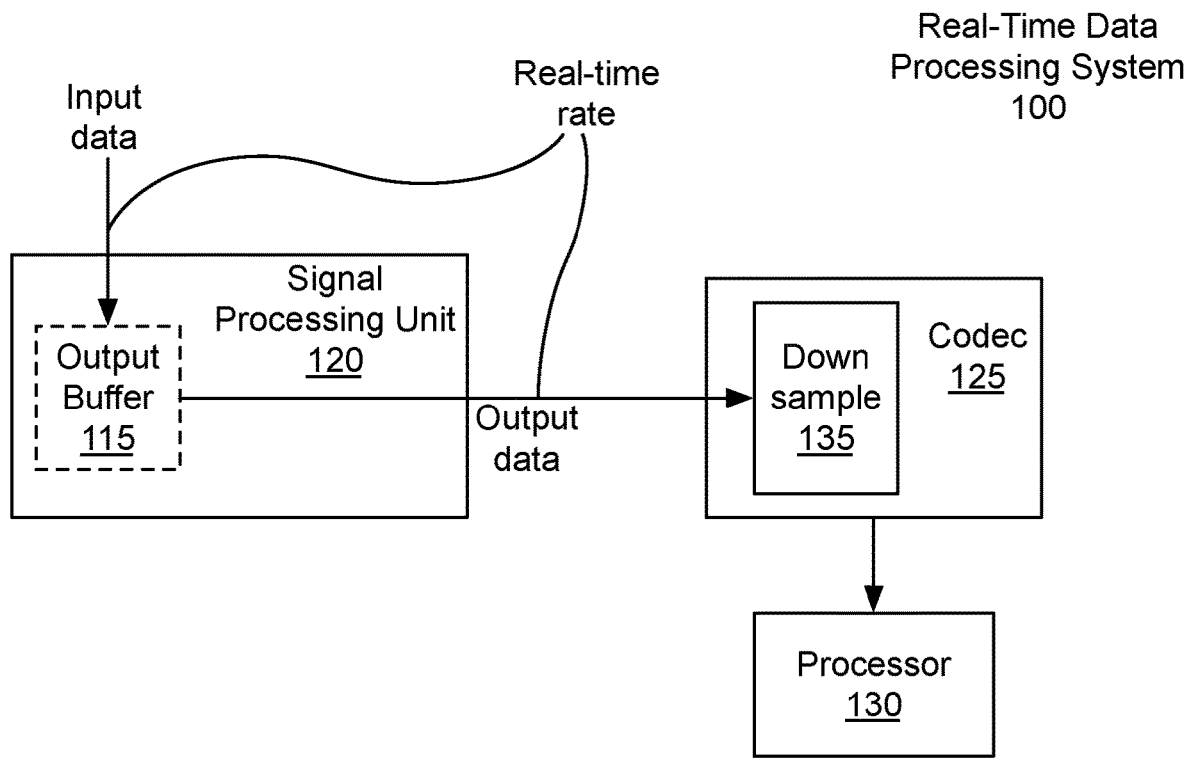
FIG. 1B illustrates a block diagram of the real-time data processing system configuration after the latency trigger event, in accordance with an embodiment.

FIG. 1B illustrates a block diagram of the real-time data processing system 100 configuration after the latency reduction trigger, in accordance with an embodiment. When the latency reduction trigger occurs, the downsample unit 105 in the signal processing unit 120 is disabled and a downsample unit 135 in the codec 125 is enabled. In an embodiment, the downsample unit 135 downsamples the output data received from the signal processing unit 120 at the real-time rate to a lower data rate. The lower data rate used by the downsample unit 135 may be equal or different than the data rate used to downsample the input data by the downsample unit 105. In an embodiment, when the downsample unit 105 and the downsample unit 135 both downsample data from the real-time rate to the same lower rate, the processor 130 receives data from the codec 125 at a constant rate both before and after the latency reduction trigger.

When the latency reduction trigger occurs, the input data is no longer downsampled and is instead, either stored into the output buffer 115 at the real-time rate or is directly transferred to the codec 125 without passing through the output buffer 115. In an embodiment, the latency may be reduced to a minimum possible amount by draining the output buffer 115 completely before disabling the downsample unit 105 and enabling the downsample unit 135. In an embodiment, when all of the downsampled input data has been transmitted to the codec 125, the downsample unit 105 in the codec 125 is enabled. In an embodiment, the latency may be reduced by a predetermined amount by draining the sample buffer 115 for a fixed amount of time or until a fixed amount of downsampled input data remains in the output buffer 115 before disabling the downsample unit 105 and enabling the downsample unit 135.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1C:
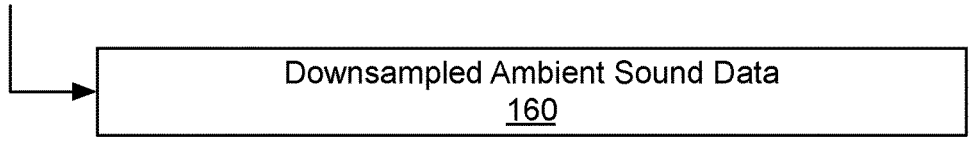
FIG. 1C illustrates a conceptual diagram of the output buffer before a data pattern is recognized, in accordance with an embodiment.

FIG. 1C illustrates a conceptual diagram of the output buffer 115 before the data pattern is recognized in an audio input data stream, in accordance with an embodiment. When the input data is an audio signal, downsampled ambient sound data 160 is continuously stored into the output buffer 115 starting at time t=0. Ambient sound data is received by the signal processing unit 120 at a first data rate (e.g., the real-time rate), is downsampled, and the downsampled ambient sound data 160 is stored into the output buffer 115 at a second data rate (e.g. the downsampled rate). At time t=2, the output buffer 115 is full. When the output buffer 115 is full and new downsampled data is received, the new downsampled data overwrites the oldest downsampled data stored in the output buffer 115. In other words, in an embodiment, the output buffer 115 is implemented as a first-in first-out buffer. In an embodiment, the output buffer 115 is implemented as a circular or ring buffer.

Figure 1D:
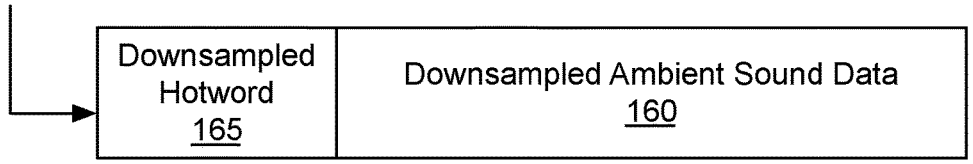
FIG. 1D illustrates another conceptual diagram of the output buffer before the data pattern is recognized, in accordance with an embodiment.

FIG. 1D illustrates another conceptual diagram of the output buffer 115 before the data pattern is recognized in the audio input data stream, in accordance with an embodiment. The hotword is received by the signal processing unit 120 at the first data rate, is downsampled, and between t=2 and t=3, the downsampled hotword 165 begins to be stored into the output buffer 115 at a second data rate. The downsampled hotword 165 may not be immediately recognized by the recognition unit 110 as matching a data pattern.

Figure 1E:
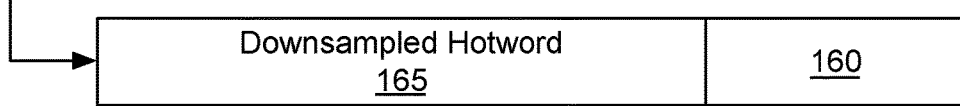
FIG. 1E illustrates another conceptual diagram of the output buffer when the data pattern is recognized, in accordance with an embodiment.

FIG. 1E illustrates another conceptual diagram of the output buffer 115 when the data pattern is recognized, in accordance with an embodiment. The hotword continues to be received by the signal processing unit 120 and at t=4, the downsampled hotword 165 is recognized by the recognition unit 110 and the recognition interrupt is generated. In an embodiment, in response to recognition of the downsampled hotword 165, the signal processing unit 120 begins to transfer a portion of the downsampled ambient sound data 160 stored in the output buffer 115 to the codec 125 at the first data rate. Importantly, the first data rate (B') is faster than the second data rate (B). Therefore, the amount of data stored in the output buffer 115 decreases at a rate of B'/B. In other words, the latency or delay incurred by data passing through the output buffer 115 decreases at a rate of B'/B. Assuming h represents the storage capacity of the output buffer 115, an amount of time t needed to "catch-up" and reduce the latency to zero is $$t = \frac{Bh}{B' - B}.$$

In an embodiment, the first downsampled data transferred from the output buffer 115 is the downsampled ambient sound data 160 stored in the output buffer 115 at t=2. In an embodiment, the first downsampled data transferred from the output buffer 115 is the downsampled hotword 165 stored in the output buffer starting between t=2 and t=3 and the downsampled ambient sound data 160 stored in the output buffer 115 is discarded.

In an embodiment, the codec 125 reads the downsampled data from the output buffer 115 and additional downsampled data may be stored in the output buffer 115 before the codec 125 begins to read the output buffer 115 at the first data rate. In an embodiment, a delay is incurred after recognition of the downsampled hotword 165 and before the signal processing unit 120 begins to transfer downsampled data stored in the output buffer 115 to the codec 125 at the first data rate. During the delay, additional downsampled data stored in the output buffer 115 and may overwrite older downsampled data before being transferred to the codec 125 after the delay. In an embodiment, the downsampled ambient sound data 160 is discarded and is not transferred to the codec 125. In an embodiment the downsampled hotword 165 is discarded and is not transferred to the codec 125.

Figure 1F:
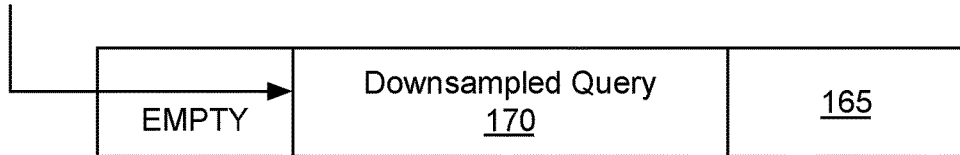
FIG. 1F illustrates a conceptual diagram of the output buffer after the data pattern is recognized and before the latency reduction trigger, in accordance with an embodiment.

FIG. 1F illustrates a conceptual diagram of the output buffer 115 after the data pattern is recognized and before the latency reduction trigger, in accordance with an embodiment. Because the downsampled data is drained from the output buffer 115 at a faster rate than the downsampled data is stored into the output buffer, the amount of downsampled data stored in the output buffer 115 is reduced and at least a portion of the output buffer 115 is empty. As shown in FIG. 1F, a downsampled query 170, received after the downsampled hotword 165 is stored into the output buffer and a portion of the output buffer 115 is empty. As the output buffer 115 is drained and becomes increasingly empty, the latency is reduced. Specifically, a delay from when the downsampled query 170 is received by the output buffer 115 to when the downsampled query 170 is processed by the processor 130 is reduced.

Figure 1G:
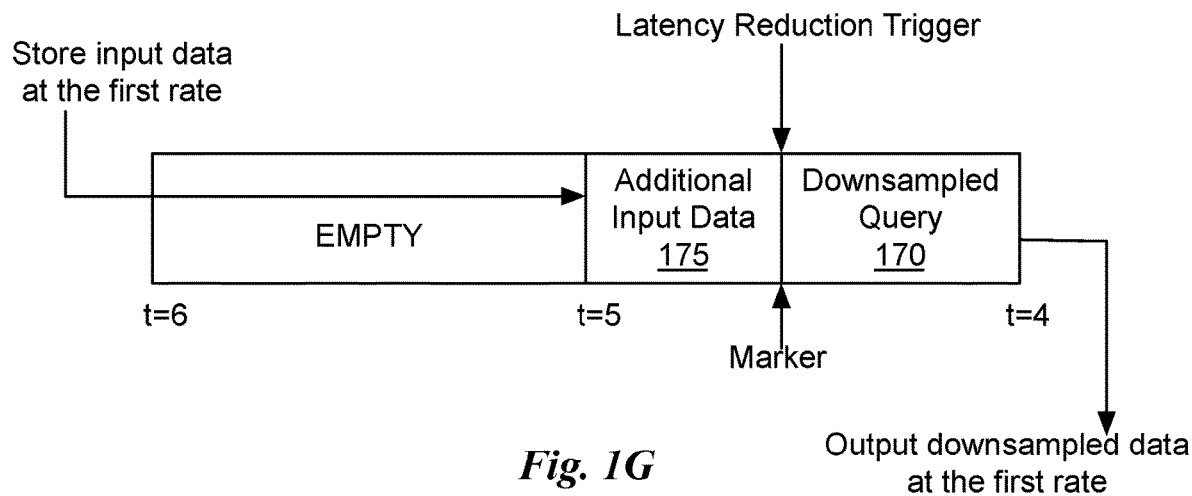
FIG. 1G illustrates a conceptual diagram of the output buffer after the latency reduction trigger, in accordance with an embodiment.

FIG. 1G illustrates a conceptual diagram of the output buffer 115 after the latency reduction trigger, in accordance with an embodiment. As shown in FIG. 1G, the latency reduction trigger is generated between t=4 and t=5, when the downsampled data stored in the output buffer 115 is drained to a predetermined level or a predetermined amount of time after the downsampled data is determined to match the data pattern. Before the latency reduction trigger, the output buffer 115 continues to output downsampled data at the first rate. After the latency reduction trigger, the output buffer 115 outputs additional input data 175 that is not downsampled at the first rate. After the latency reduction trigger, the additional input data 175 is stored into the output buffer 115 at the first rate instead of at the second rate. For example, twice as much additional input data 175 is stored into the output buffer 115 for a fixed amount of time after the latency reduction trigger, compared with the amount of downsampled input data that is stored into the output buffer 115 for the same fixed amount of time when the input data is downsampled by 2. A marker may be inserted into the output buffer 115 between the downsampled query 170 and the additional input data 175. In an embodiment, the marker is used by the codec 125 to enable the downsample unit 135.

Figure 1H:
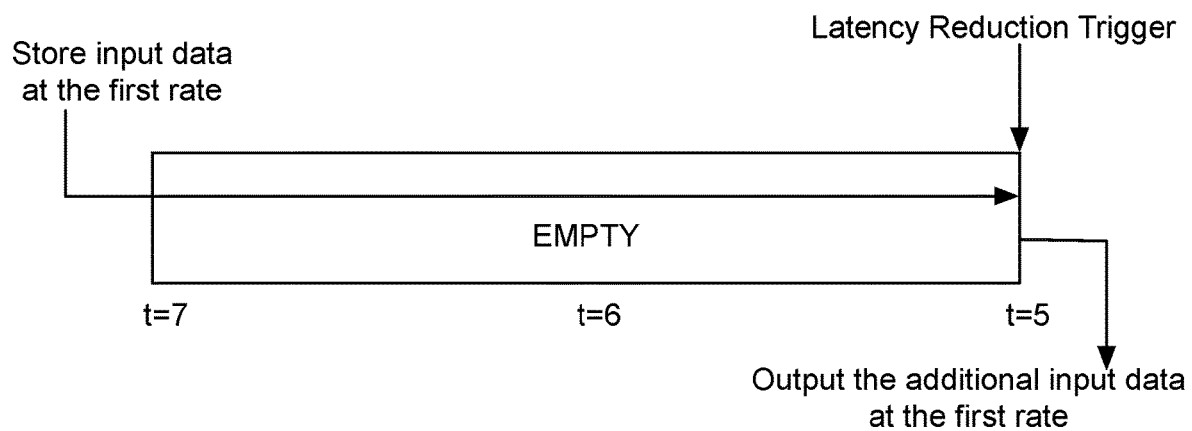
FIG. 1H illustrates another conceptual diagram of the output buffer after the latency reduction trigger, in accordance with an embodiment.

FIG. 1H illustrates another conceptual diagram of the output buffer 115 after the latency reduction trigger, in accordance with an embodiment. As shown in FIG. 1H, the latency reduction trigger is generated at t=5, when the downsampled data stored in the output buffer 115 is completely drained and the output buffer 115 becomes empty. After the latency reduction trigger, the additional input data 175 continues to be stored into the output buffer 115 at the same rate that the additional input data 175 is drained from the output buffer 115. Therefore, the amount of data stored in the output buffer 115 is maintained and the latency is no longer reduced for data transferred from the signal processing unit 120 after the latency reduction trigger.

In contrast, in a conventional system, the first and second rates are equal, so the latency is maintained (unless a secondary path is available). Some conventional solutions require an additional communication path from a device that recognizes the hotword to the primary processor to "catch-up" and reduce the latency. The additional communication path may be faster and also adds extra cost to the system. In contrast, the real-time data processing system 100 is able to catch-up and reduce the latency without transmitting the input data (or downsampled input data) through a second communication path.

Importantly, the clock rate of the signal processing unit 120 is constant. The same clock rate may be used by the signal processing unit 120 while the downsampled data is transferred from the signal processing unit 120 to the codec 125 and while the input data is transferred from the signal processing unit 120 to the codec 125. Changing the clock rate of a processing device typically requires that the processing device be put into an idle state, additional delay or increase in the latency. Because the clock rate is constant, no additional delay or increase in the latency is incurred for the signal processing unit 120.

Figure 2A:
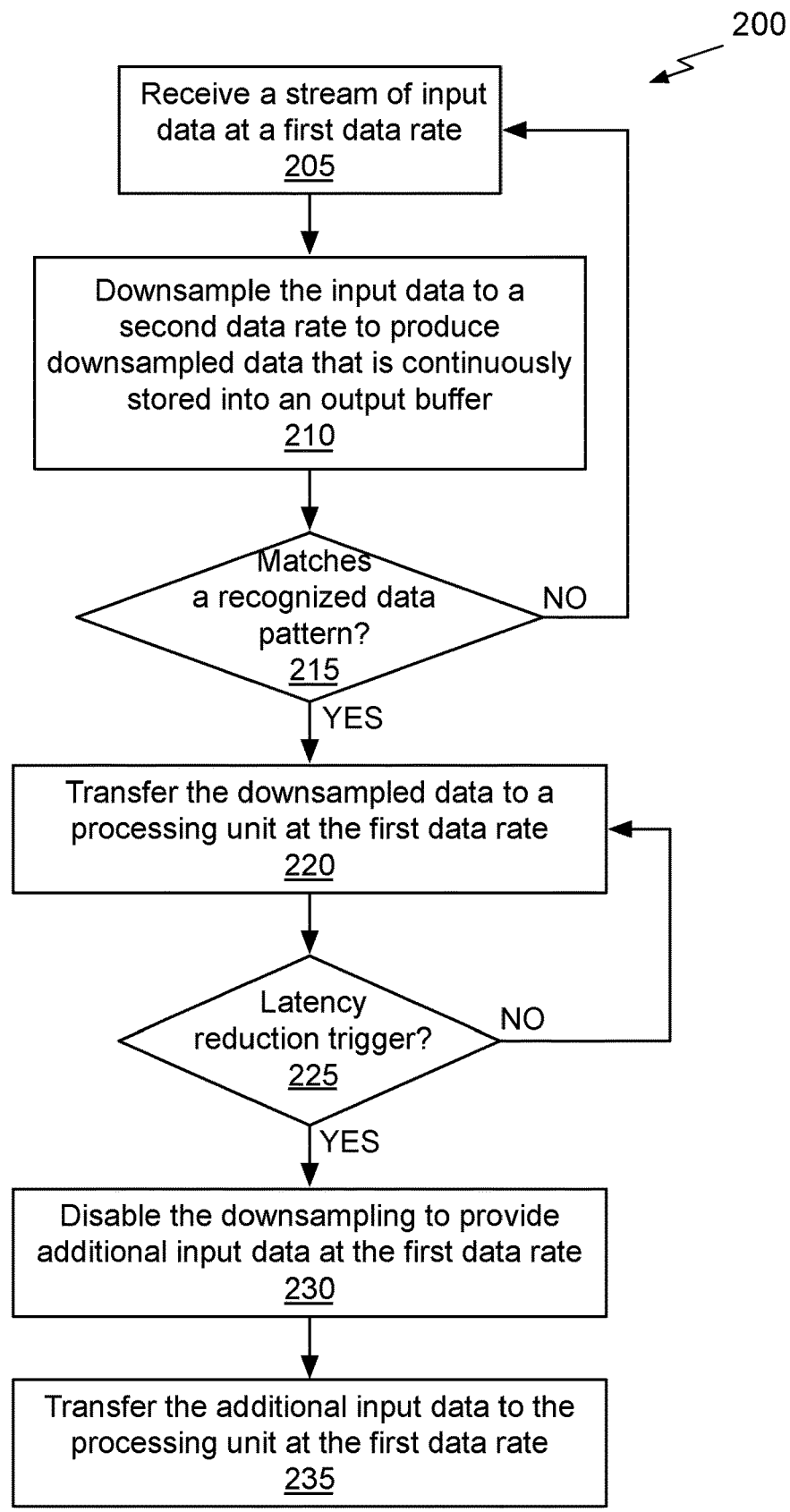
FIG. 2A illustrates a flowchart of a method for real-time data processing, in accordance with an embodiment.

FIG. 2A illustrates a flowchart of a method 200 for real-time data processing, in accordance with an embodiment. Although method 200 is described in the context of a processing unit, the method 200 may also be performed by a program, custom circuitry, or by a combination of custom circuitry and a program. For example, the method 200 may be executed by a GPU (graphics processing unit), CPU (central processing unit), or any processor capable of recognizing a pattern in an input data stream. Furthermore, persons of ordinary skill in the art will understand that any system that performs method 200 is within the scope and spirit of embodiments of the present invention.

At step 205, the signal processing unit 120 receives a stream of input data at a first data rate. At step 210, the downsample unit 105 downsamples the input data to a second data rate to produce downsampled data that is continuously stored into the output buffer 115. At step 215, the recognition unit 110 determines if the downsampled data matches a data pattern, and, if not, the signal processing unit 120 returns to step 205. Otherwise, when the data pattern is matched, at step 220, the signal processing unit 120 transfers the downsampled data from the output buffer 115 to a processing unit at the first data rate. In an embodiment, the processing unit is the codec 125. In an embodiment, the processing unit is the processor 130.

At step 225, the signal processing unit 120 determines if a latency reduction trigger is detected, and, if not, the signal processing unit 120 returns to step 220. Otherwise, at step 230, the signal processing unit 120 disables the downsample unit 105 to provide additional input data at the first data rate. At step 235, the signal processing unit 120 transfers the additional input data to the processing unit at the first data rate. In an embodiment, a downsample unit 135 within the processing unit is enabled to downsample the additional input data received by the processing unit. Importantly, the downsample unit 135 is not enabled to downsample the downsampled data received by the processing unit and is enabled to downsample the additional input data received by the processing unit. Therefore, a stream of downsampled data is available within the processing unit both before and after the latency reduction trigger.

Figure 2B:
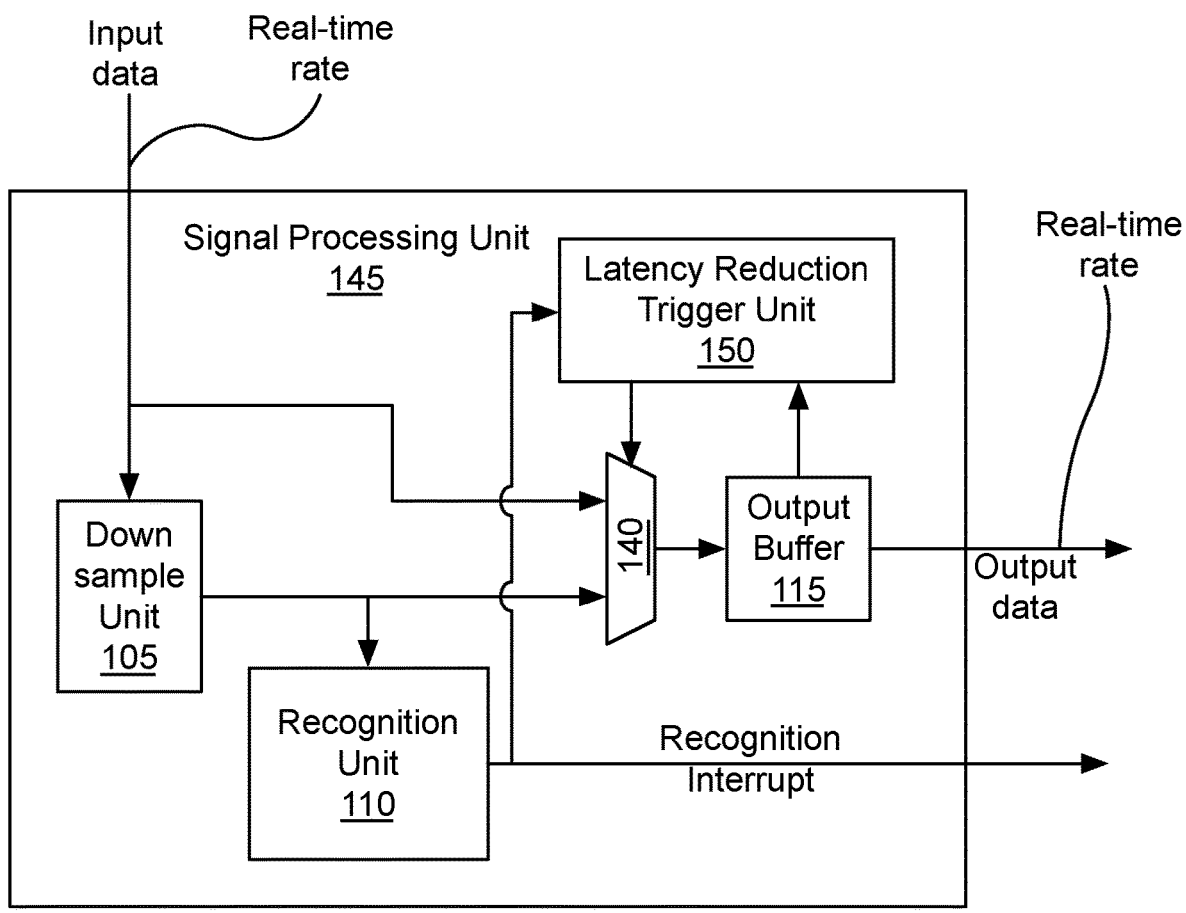
FIG. 2B illustrates another block diagram of a signal processing device, in accordance with an embodiment.

FIG. 2B illustrates another block diagram of a signal processing unit 145, in accordance with an embodiment. Although the signal processing unit 145 is described in the context of processing units, the signal processing unit 145 may be implemented as a program, custom circuitry, or by a combination of custom circuitry and a program. Furthermore, persons of ordinary skill in the art will understand that any signal processing unit that performs the operations of the signal processing unit 145 is within the scope and spirit of embodiments of the present invention.

The signal processing unit 145 may be configured to perform the operations of the signal processing unit 120 and may replace the signal processing unit 120 in the real-time data processing system 100. The signal processing unit 145 receives the input data at the real-time rate and outputs the output data at the same real-time rate. In addition to the downsample unit 105, the recognition unit 110, and the output buffer 115, the signal processing unit 145 includes a multiplexer 140 and a latency reduction trigger unit 150.

In an embodiment, the output buffer 115 receives the downsampled data from the recognition unit 110. As shown in FIG. 2B, the output buffer 115 and the recognition unit 110 are configured in parallel and both receive the downsampled data generated by the downsample unit 105. Before the latency reduction trigger is generated by the latency reduction trigger unit 150, the downsampled data is continuously streamed into the output buffer 115 through the multiplexer 140. Once the data pattern is recognized by the recognition unit 110, the downsampled data is transferred from the output buffer 115 at the real-time rate. In an embodiment, the downsampled data is transferred from the output buffer 115 in response to the recognition interrupt. In an embodiment, the signal processing unit 120 begins transferring the downsampled data in response to receiving a read request.

Figure 2C:
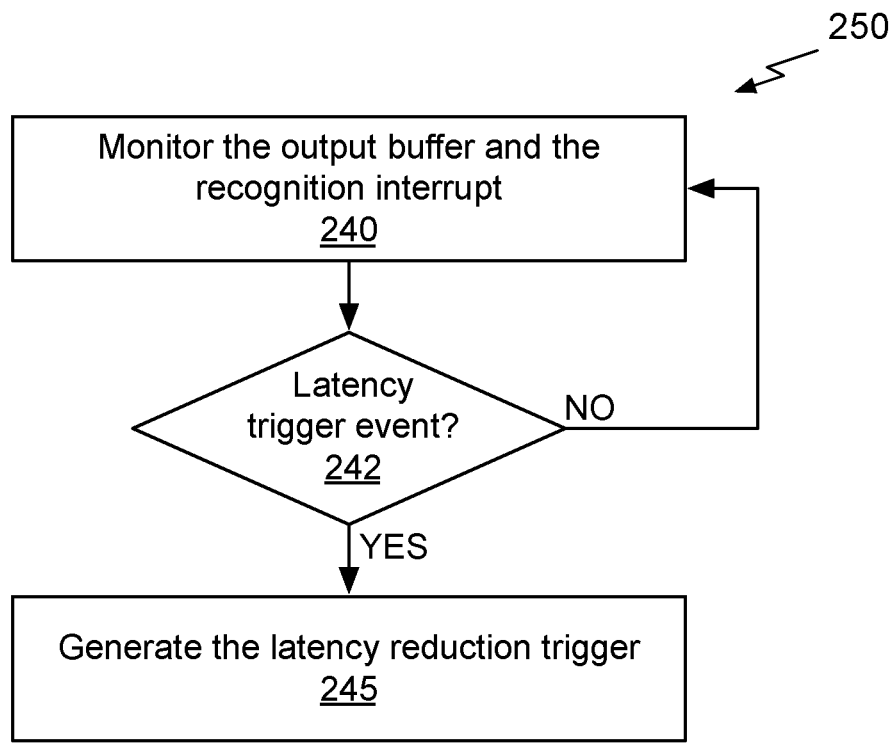
FIG. 2C illustrates a flowchart of a method for generating a latency reduction trigger, in accordance with an embodiment.

FIG. 2C illustrates a flowchart of a method 250 for generating the latency reduction trigger, in accordance with an embodiment. Although method 250 is described in the context of the latency reduction trigger unit 140, the method 250 may also be performed by a program, custom circuitry, or by a combination of custom circuitry and a program. Furthermore, persons of ordinary skill in the art will understand that any system that performs method 250 is within the scope and spirit of embodiments of the present invention.

At step 240, the latency reduction trigger unit 150 monitors the output buffer 115 and the recognition interrupt to generate the latency reduction trigger. At step 242, the latency reduction trigger unit 150 determines if a latency trigger event has occurred, and, if not, returns to step 240. Otherwise, the latency reduction trigger unit 150 proceeds to step 245 and generates the latency reduction trigger. A latency reduction trigger event may be defined and used to control when the latency reduction trigger is generated. In an embodiment, the latency reduction trigger event is the output buffer 115 becoming empty. In an embodiment, the latency reduction trigger event is the output buffer 115 being drained to a predetermined level. In an embodiment, the latency reduction trigger event is a predetermined amount of time after the recognition interrupt. When the latency reduction trigger occurs, the multiplexer 140 selects the input data for output to the output buffer 115. In an embodiment, the input data is directly coupled to the output data through the multiplexer 140, bypassing the output buffer 115, when the latency reduction trigger occurs. In an embodiment, the latency reduction trigger unit 150 inserts a marker into the output buffer 115 between the downsampled query 170 and the additional input data 175. In an embodiment, the marker is used to enable the downsample unit 135.

Figure 2D:
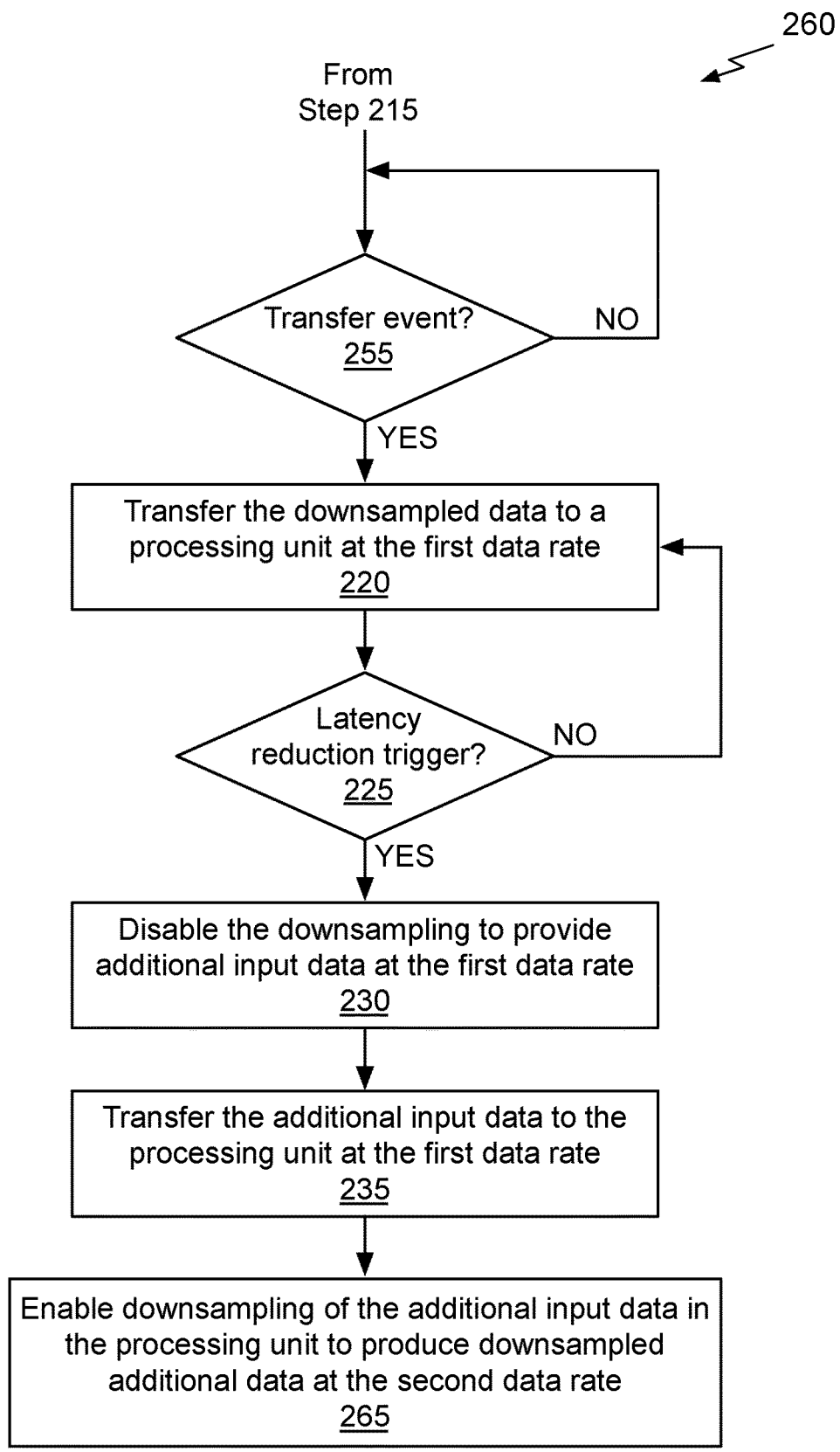
FIG. 2D illustrates a flowchart of another method for real-time data processing, in accordance with an embodiment.

FIG. 2D illustrates a flowchart of another method 260 for real-time data processing, in accordance with an embodiment. Steps 205, 210, and 215 are completed as previously described in conjunction with FIG. 2A. When, at step 215, the recognition unit 110 determines that the downsampled input data matches a data pattern, at step 255, the signal processing unit 120 or 145 determines if a transfer event occurs. In an embodiment, the transfer event occurs when the recognition interrupt is generated. In an embodiment, the transfer event occurs when a read request is received by the signal processing unit 120 or 145. The downsampled data generated by the downsample unit 105 continues to be stored into the output buffer 115 before, during, and after the recognition interrupt and the transfer event.

When, at step 255, the signal processing unit 120 or 145 determines the transfer event has not occurred, step 255 is repeated. Otherwise, at step 220 the downsampled data is transferred from the signal processing unit 120 or 145 to the processing unit at the first data rate. In an embodiment, the processing unit is the codec 125. In an embodiment, the processing unit is the processor 130.

At step 225, the signal processing unit 120 or 145 determines if a latency reduction trigger has occurred, and, if not, the signal processing unit 120 or 145 returns to step 220. Otherwise, at step 230, the signal processing unit 120 or 145 disables the downsample unit 105 to provide additional input data at the first data rate. At step 235, the additional input data is transferred from the signal processing unit 120 or 145 to the processing unit at the first data rate. At step 265, the downsample unit 135 is enabled to downsample the additional input data that is received by the processing unit from the signal processing unit 120 or 145. The downsample unit 135 produces downsampled additional data at the second data rate.

Reducing the latency for data transfers following a recognition event enables real-time processing with reduced response time. The latency is reduced for real-time data transfer without an additional port or connection for transferring input data between the signal processing unit 120 or 145 and either the codec 125 or the processor 130. Furthermore, a constant clock rate may be used by the signal processing unit 120 and 145 and the signal processing unit 120 and 145 may each be a synchronous device.

Parallel Processing Architecture

Figure 3:
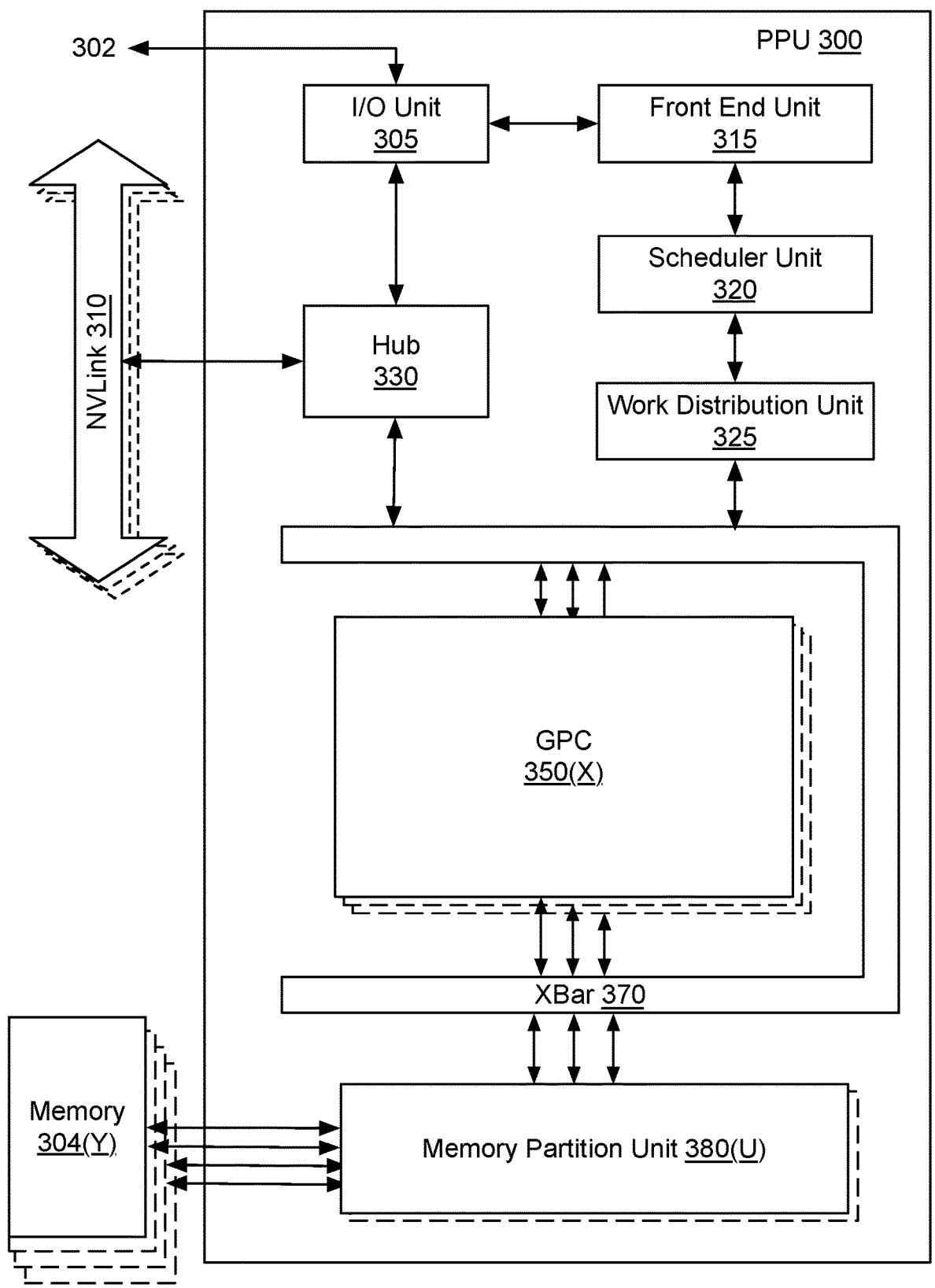
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. The results can be transmitted to another PPU 304 or CPU via the NVLink 310. In an embodiment, the PPU 300 includes a number U of partition units 380 that is equal to the number of separate and distinct memory devices 304 coupled to the PPU 300. A partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
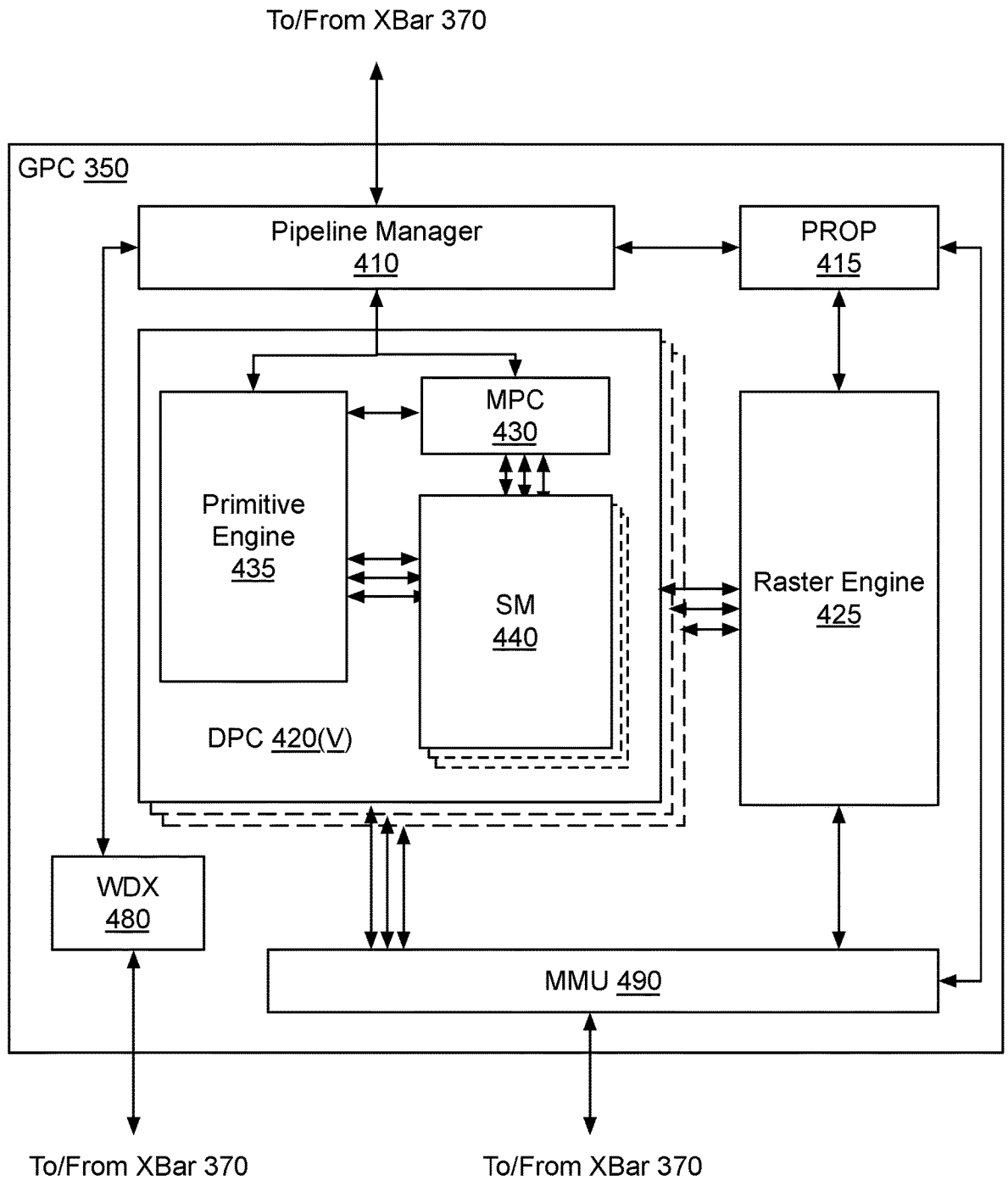
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
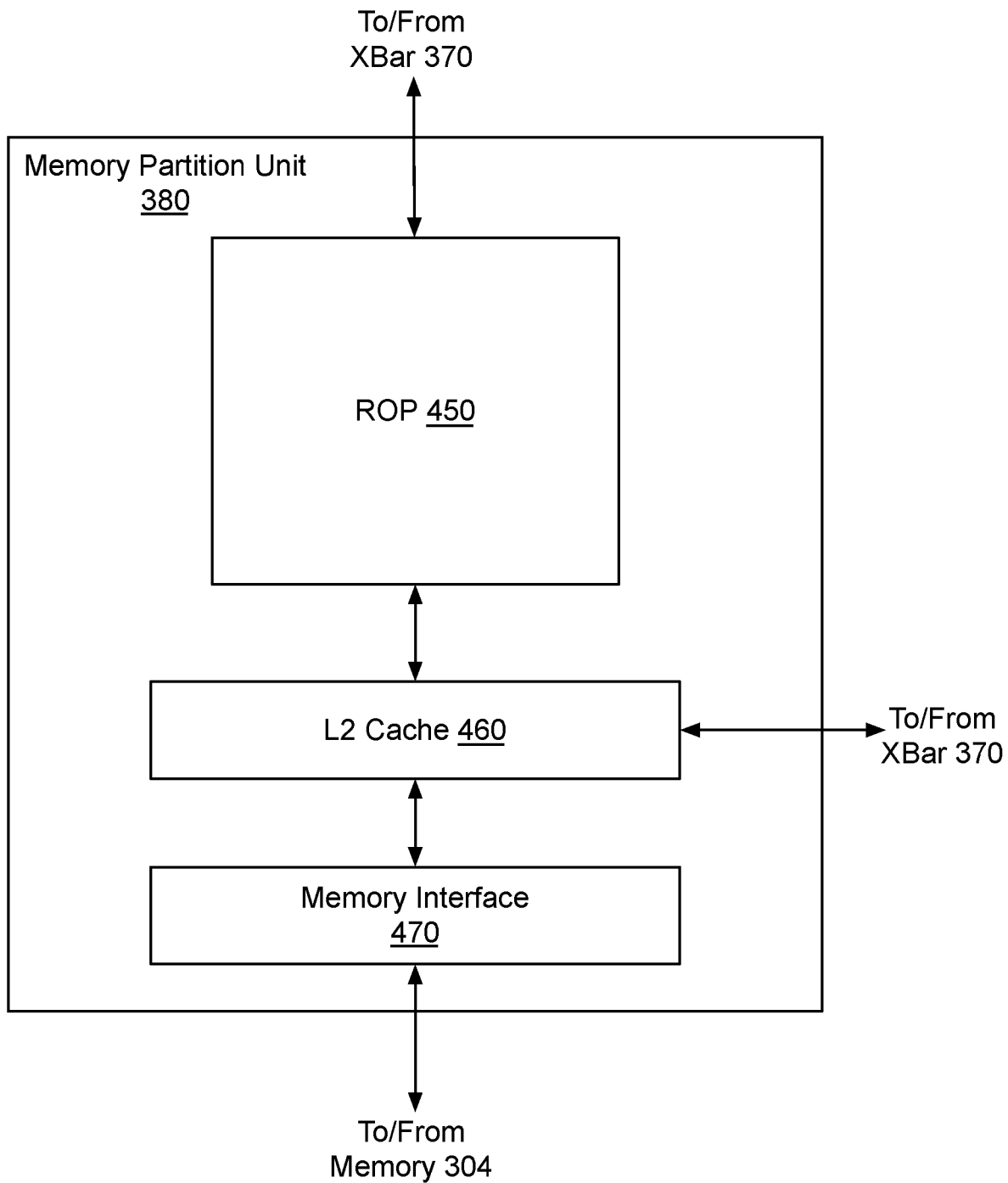
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of partition units 380, where each pair of partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
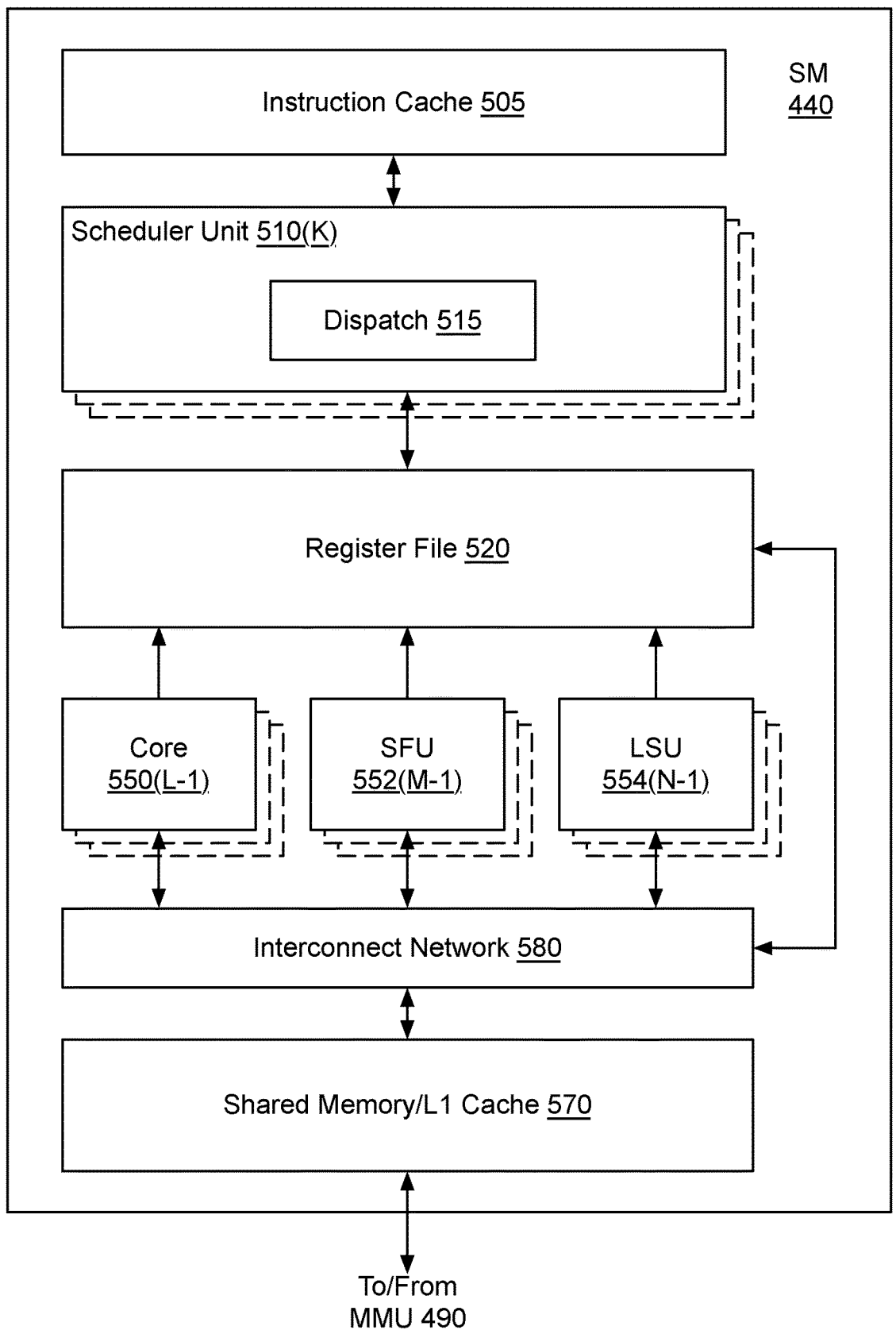
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (e.g., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 204, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
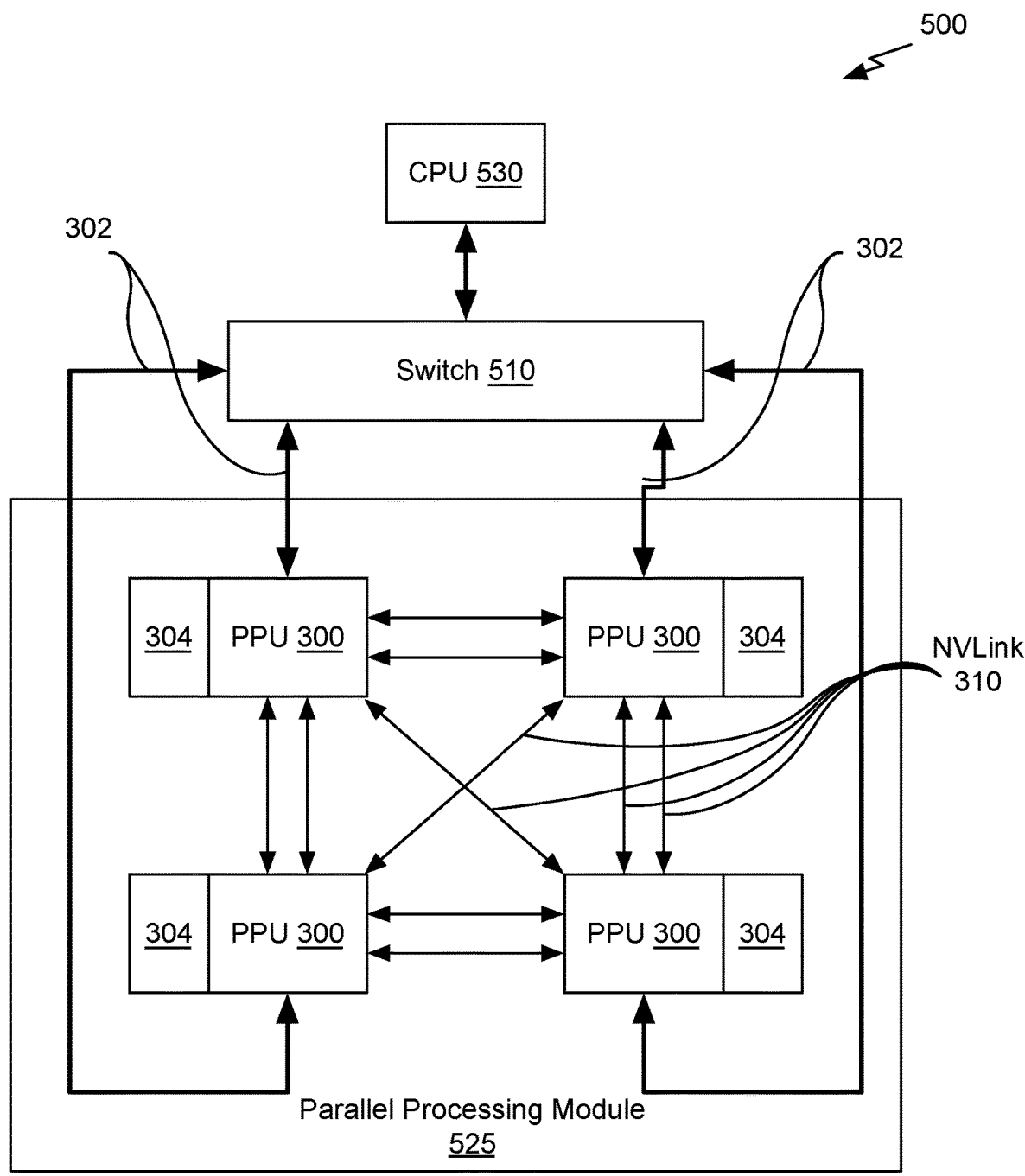
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement the methods 200 250, and/or 260 shown in FIGS. 2A, 2C, and 2D, respectively. The processing system 500 includes a CPU 530, switch 510, and multiple PPUs 300 each and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
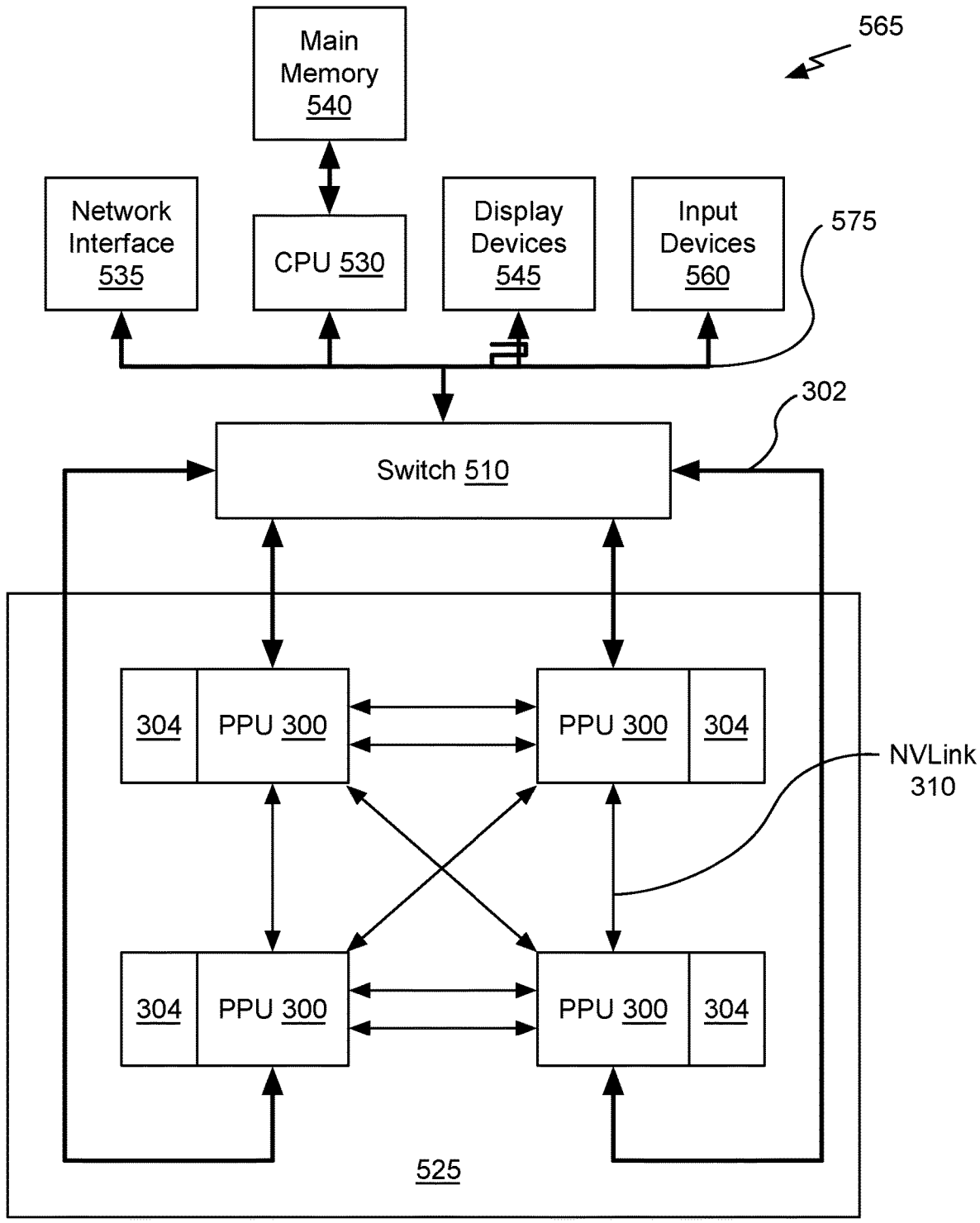
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the methods 200 250, and/or 260 shown in FIGS. 2A, 2C, and 2D, respectively.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
receiving a stream of input data at a first data rate by a real-time data processing system;
downsampling the input data to a second data rate to produce downsampled data that is continuously stored into an output buffer;
determining the downsampled data matches a data pattern;
transferring the downsampled data to a processing unit at the first data rate;
in response to a latency reduction trigger, disabling the downsampling to produce additional input data at the first data rate; and
transferring the additional input data to the processing unit at the first data rate.

2. The computer-implemented method of claim 1, wherein the latency reduction trigger is generated when the output buffer is empty.

3. The computer-implemented method of claim 1, wherein the latency reduction trigger is generated when the output buffer is drained to a predetermined level.

4. The computer-implemented method of claim 1, wherein the latency reduction trigger is generated a predetermined amount of time after the downsampled data is determined to match the data pattern.

5. The computer-implemented method of claim 1, wherein the transferring of the downsampled data begins in response to receiving a read request from the processing unit.

6. The computer-implemented method of claim 1, further comprising outputting a recognition interrupt signal when the downsampled data is determined to match the data pattern.

7. The computer-implemented method of claim 1, wherein the input data is an audio signal and the data pattern is a hotword.

8. The computer-implemented method of claim 1, wherein the second data rate is lower than the first data rate.

9. The computer-implemented method of claim 1, wherein the additional input data is continuously stored into the output buffer at the first data rate before being transferred to the processing unit.

10. The computer-implemented method of claim 1, wherein the processing unit enables downsampling for the additional input data received at the first data rate to provide additional data at the second data rate.

11. The computer-implemented method of claim 1, wherein transferring the downsampled data comprises draining the downsampled data from the output buffer at a faster rate than the output buffer is filled.

12. The computer-implemented method of claim 11, wherein transferring the additional downsampled data comprises draining the additional downsampled data from the output buffer at a rate equal to a rate at which the output buffer is filled.

13. A system, comprising:
a signal processing unit configured to:
receive a stream of input data at a first data rate;
downsample the input data to a second data rate to produce downsampled data that is continuously stored into an output buffer;
determine the downsampled data matches a data pattern;
transfer the downsampled data to a processing unit at the first data rate;
in response to a latency reduction trigger, disable the downsampling to produce additional input data at the first data rate; and
transfer the additional input data to the processing unit at the first data rate.

14. The system of claim 13, wherein the latency reduction trigger is generated when the output buffer is empty.

15. The system of claim 13, wherein the latency reduction trigger is generated when the output buffer is drained to a predetermined level.

16. The system of claim 13, wherein the latency reduction trigger is generated a predetermined amount of time after the downsampled data is determined to match the data pattern.

17. The system of claim 13, wherein the transferring of the downsampled data begins in response to receiving a read request from the processing unit.

18. The system of claim 13, wherein the signal processing unit is further configured to output a recognition interrupt signal when the downsampled data is determined to match the data pattern.

19. The system of claim 13, wherein the second data rate is lower than the first data rate.

20. A non-transitory computer-readable media storing computer instructions for processing a stream of input data that, when executed by one or more processors, cause the one or more processors to perform the steps of:
receiving the stream of input data at a first data rate by a real-time data processing system;
downsampling the input data to a second data rate to produce downsampled data that is continuously stored into an output buffer;
determining the downsampled data matches a data pattern;
transferring the downsampled data to a processing unit at the first data rate;
in response to a latency reduction trigger, disabling the downsampling to produce additional input data at the first data rate; and
transferring the additional input data to the processing unit at the first data rate.

* * * * *